Nov. 14, 1950          A. M. GORFIN          2,529,767
PRESSURE COOKER CLOSURE
Filed Sept. 21, 1946          2 Sheets—Sheet 1
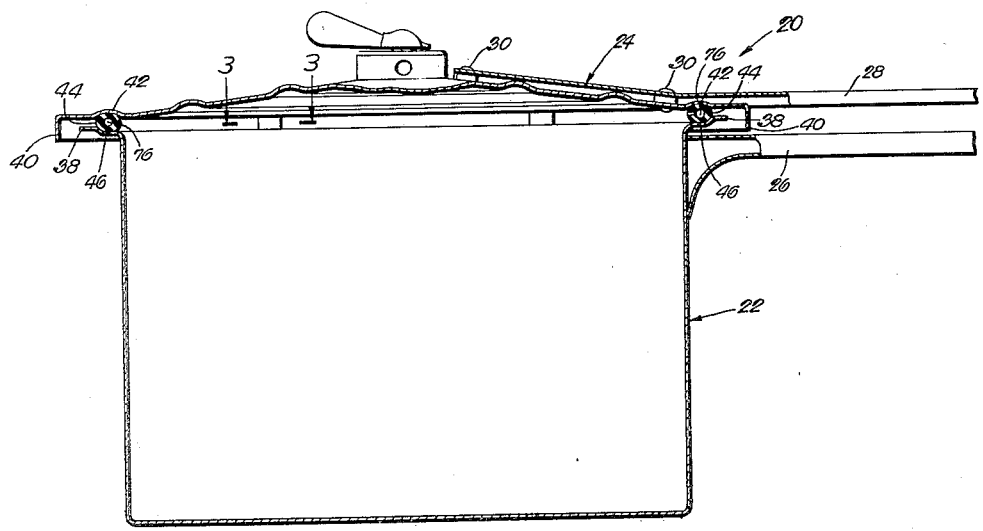
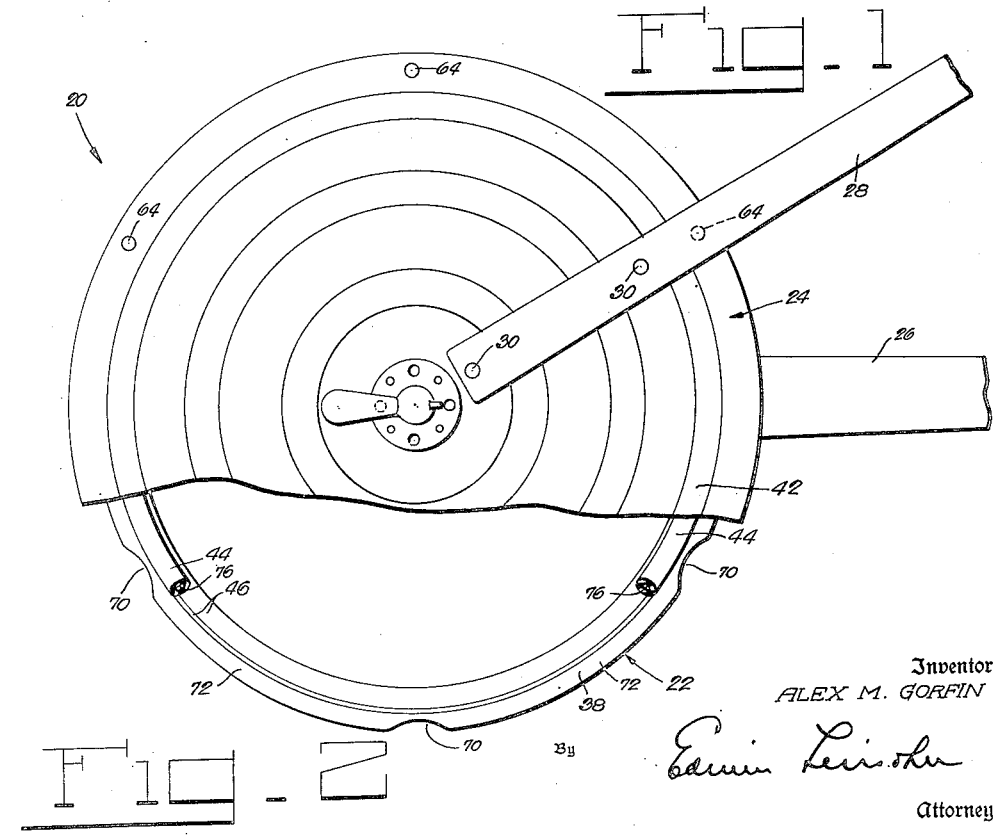
Inventor
ALEX M. GORFIN
By Edwin Levisohn
Attorney Nov. 14, 1950 A. M. GORFIN 2,529,767
PRESSURE COOKER CLOSURE
Filed Sept. 21, 1946 2 Sheets-Sheet 2
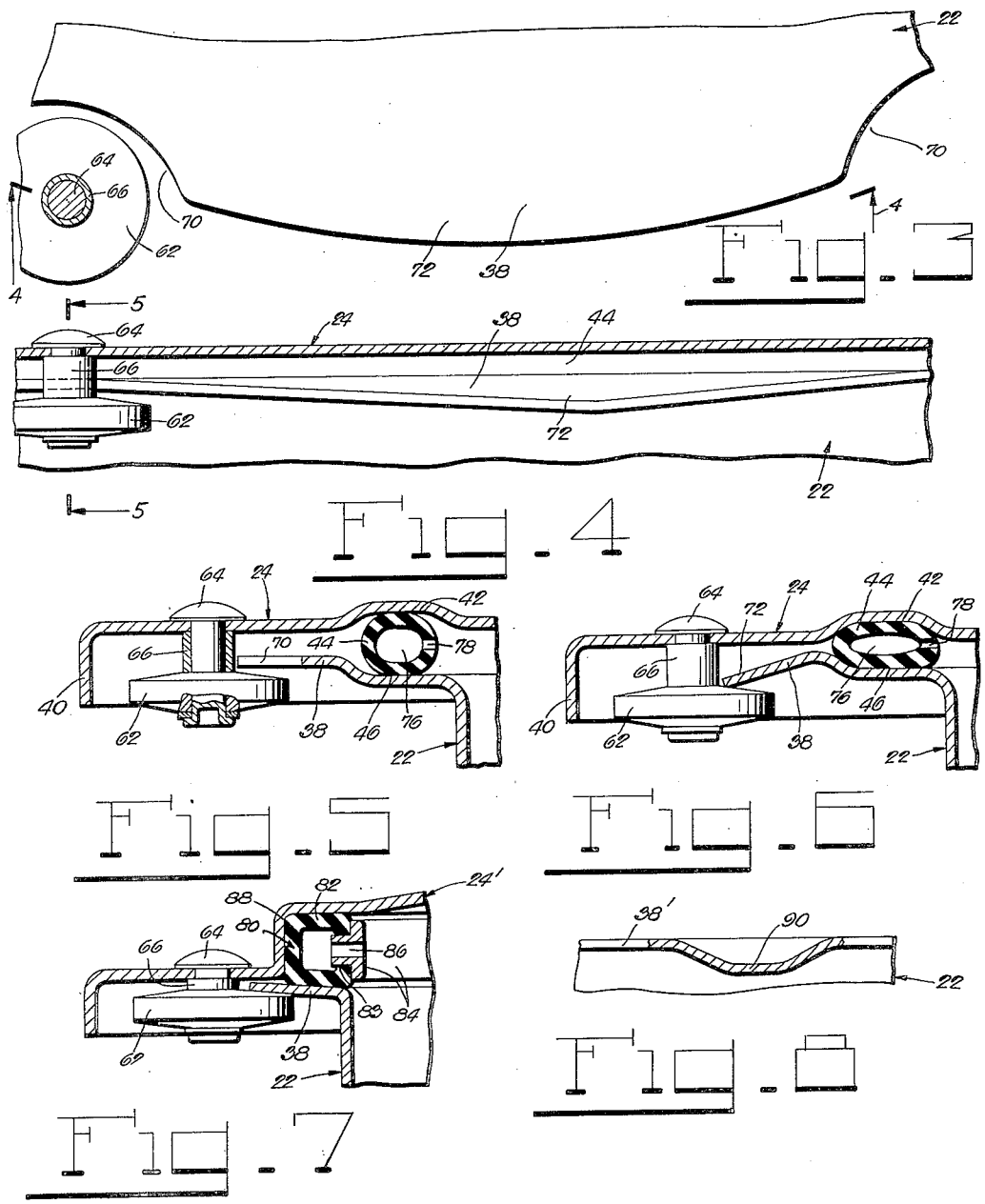
Inventor
ALEX M. GORFIN
By Erwin [signature]
Attorney Patented Nov. 14, 1950

2,529,767

UNITED STATES PATENT OFFICE 2,529,767

PRESSURE COOKER CLOSURE

Alex M. Gorfin, New York, N. Y., assignor to Legion Utensils Co., Long Island City, N. Y., a limited partnership of New York Application September 21, 1946, Serial No. 698,532

2 Claims. (Cl. 220—40)

This invention relates to pressure cookers for foods, or the like.

It is the primary object of the present invention to provide a pressure cooker of this type with a readily removable, quick-sealing cover which safely withstands the normal internal pressures to which the cooker is subjected when in use.

The above and other objects, features and advantages of the invention will be fully understood from the following description, considered in connection with the accompanying illustrative drawings.

In the drawings:

Fig. 1 is a section through a pressure cooker embodying the present invention;

Fig. 2 is a plan view, partly broken away, of the same pressure cooker;

Fig. 3 is a greatly enlarged, fragmentary section taken on the line 3—3 of Fig. 1;

Fig. 4 is a section taken on the line 4—4 of Fig. 3;

Fig. 5 is a section taken on the line 5—5 of Fig. 4;

Fig. 6 is a section similar to Fig. 5, showing the cover of the cooker in locked position;

Fig. 7 is a fragmentary section through a part of a cooker having a modified sealing ring; and Fig. 8 illustrates a modified portion of the cooker for locking the closed cover thereon.

Referring to the drawings and particularly to Figs. 1 and 2 thereof, the reference numeral 20 designates a pressure cooker having the customary container or kettle 22 and a cover 24 therefor. The kettle 22 is preferably provided with a handle 26 which may be welded or otherwise secured to the kettle. The cover 24 is preferably also provided with a handle 28 which may be riveted thereto as at 30. As shown in Fig. 1, the cover 24 extends beyond the outwardly turned, annular top flange 38 on the kettle 22 and has a depending annular skirt 40. Seated in an annular depression 42 in the cover 24, and preferably suitably carried by the latter is an annular gasket or sealing ring 44 of any suitable resilient material, such as rubber, for instance. The annular flange 38 of the kettle 22 is preferably provided with a similar annular depression 46 which serves as a counterseat for the sealing ring 44 when the cover 24 is applied to the kettle as shown in Fig. 1.

The cover 24 carries near its periphery a plurality of equi-angularly spaced rollers 62. These rollers 62 are preferably secured to the cover 24 by rivets 64 (Figs. 4, 5 and 6), and held spaced from the cover by interposed spacers 66. The rollers 62 are so arranged on the cover 24 that they project within the confines of the annular flange 38 on the kettle 22 when the cover 24 is applied to the latter. The annular flange 38 on the kettle 22 is provided with a plurality of peripheral notches 70 corresponding in number and spacing to the rollers 62 on the cover 24. The notches 70 are of such depth that they are cleared by the rollers 62 on their descent beneath the annular flange 38 on the kettle, when the cover 24 is placed on the kettle with the rollers 62 in alignment with said notches 70. Hence, the cover 24 may be closed on the kettle 22 only when the rollers 62 on the former are in alignment with the notches 70 in the latter, as will be readily understood. After thus placing the cover 24 on the kettle 22, the former is turned, whereby the rollers 62 come into engagement, and cooperate, with the adjacent cam or wedge portions 72 which are formed by the flange 38 on the kettle between consecutive notches 70 therein (Figs. 4 and 6). The cover 24 may, in order to be locked tightly on the kettle, be turned from the position shown in Fig. 2 into a position in which the handle 28 on the cover is co-extensive with the handle 26 on the kettle, i. e., approximately 30 degrees if six rollers 62 are provided on the cover, as in the present instance. It follows from Figs. 4 to 6 that the rollers 62 on the cover 24 and the cam portions 72 on the kettle 22 cooperate to draw the kettle flange 38 and the cover 24 into firm clamping engagement with the interposed sealing ring 44, and thereby compress the latter to the extent indicated in Fig. 6. The sealing ring 44 is preferably hollow throughout as at 76, and is provided on the inside with a plurality of angularly spaced vent holes 78 which provide communication between the interior of the kettle 22 and the interior of the sealing ring 44. In thus providing communication between the interior of the sealed kettle 22 and the hollow sealing ring 44, the latter is subjected to the same internal pressure as the kettle and is thereby expanded into even firmer sealing engagement with the kettle and locked cover thereon.

Fig. 7 illustrates a modified sealing ring 80 in the cooker. This ring is in the form of a tube 82 of rubber or the like, being slotted on the inside as at 83 for the reception of an annular metallic ring 84 which is provided with one or more angularly spaced vents 86 that provide communication between the interior of the closed kettle 22 and the interior of the sealing ring 80. The sealing ring 80 may rest in, and be suitably secured to, an annular recess 88 in the cover 24', and may be seated on the annular flange 38 of the kettle 22 when the cover is closed.

Fig. 8 illustrates a modified annular top flange 38' on the kettle 22 which is provided, in lieu of the cam or wedge portions 72 between consecutive notches 70 therein as shown in Figs. 3 and 4, with local, impressed beads 90 which cooperate with the rollers 62 on the cover 24 to lock the latter to the kettle, as will be readily understood.

While I have shown and described the preferred embodiment of my invention, it will be understood that various changes in the details of construction and in the arrangement of parts may be made without departing from the underlying idea or principles of the invention within the scope of the appended claims.

Having thus described my invention, what I claim and desire to secure by Letters Patent is:

1. A pressure cooker comprising, a kettle member having an outwardly projecting annular flange at its open top, said kettle member and flange being of substantially uniform wall thickness throughout and said flange having inner and outer annular parts of which the inner part is offset axially inwardly of said kettle member relative to said outer part so as to provide an annular shoulder between said parts, and said outer part having angularly spaced portions inclined to the central axis of said member and being peripherally notched intermediate said portions, a removable cover member for said kettle member, an annular gasket interposed between said members and bearing against said inner annular flange part and shoulder on said kettle member, and followers projecting from said cover member, said followers being passable through said peripheral notches into cooperative alignment with the inclined flange portions of said kettle member on bringing said members into closing relation, and said followers cooperating with said inclined flange portions to clamp said members against the interposed gasket on relative rotation between said members in their closed relation.

2. A pressure cooker comprising, a kettle member having an outwardly projecting annular flange at its open top, said kettle member and flange being of substantially uniform wall thickness throughout and said flange having inner and outer annular parts of which the inner part is offset axially inwardly of said kettle member relative to said outer part so as to provide an annular shoulder between said parts, and said outer part having angularly spaced, impressed beads and being peripherally notched between consecutive beads, a removable cover member for said kettle member, a gasket interposed between said members and bearing against said inner annular flange part and shoulder on said kettle member, and followers projecting from said cover member, said followers being passable through said notches into cooperative alignment with the beads on said flange on bringing said members into closing relation, and said followers cooperating with said beads to clamp said members against the interposed gasket on relative rotation between said members in their closed relation.

ALEX M. GORFIN.

REFERENCES CITED

The following references are of record in the file of this patent:

UNITED STATES PATENTS

| Number | Name | Date |
| --- | --- | --- |
| 993,013 | Bartlett | May 23, 1911 |
| 1,220,873 | Meyers | Mar. 27, 1917 |
| 1,369,249 | Kroupa | Feb. 22, 1921 |
| 1,836,192 | Shoenberg et al. | Dec. 15, 1931 |
| 1,904,250 | Purvis | Apr. 18, 1933 |
| 2,016,226 | Clausen | Oct. 1, 1935 |
| 2,016,228 | Clausen | Oct. 1, 1935 |
| 2,104,799 | Evans | Jan. 11, 1938 |
| 2,201,322 | Schwartz | May 21, 1940 |
| 2,218,188 | Wittenberg | Oct. 15, 1940 |
| 2,322,139 | Kaelin | June 15, 1943 |
| 2,399,115 | Hansen et al. | Apr. 23, 1946 |

FOREIGN PATENTS

| Number | Country | Date |
| --- | --- | --- |
| 14,500 | Germany | Sept. 24, 1881 |